United States Patent
Castinado et al.

(10) Patent No.: US 10,437,991 B2
(45) Date of Patent: Oct. 8, 2019

(54) DISTRACTIONAL VARIABLE IDENTIFICATION FOR AUTHENTICATION OF RESOURCE DISTRIBUTION

(71) Applicant: BANK OF AMERICA CORPORATION, Charlotte, NC (US)

(72) Inventors: Joseph Benjamin Castinado, North Glenn, CO (US); Jeffery B. Schroeder, Indian Trail, NC (US); William August Stahlhut, The Colony, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 253 days.

(21) Appl. No.: 15/450,729

(22) Filed: Mar. 6, 2017

(65) Prior Publication Data

US 2018/0253552 A1    Sep. 6, 2018

(51) Int. Cl.
*G10L 17/26* (2013.01)
*G06F 21/55* (2013.01)
*G06N 10/00* (2019.01)
*G10L 25/63* (2013.01)

(52) U.S. Cl.
CPC ........... *G06F 21/554* (2013.01); *G06N 10/00* (2019.01); *G10L 25/63* (2013.01)

(58) Field of Classification Search
CPC ........ G06F 21/554; G06N 10/00; G10L 25/63
See application file for complete search history.

(56) References Cited

U.S. PATENT DOCUMENTS

| | | |
|---|---|---|
| 6,943,724 B1 * | 9/2005 | Brace ................. G01S 13/9029 342/175 |
| 7,135,701 B2 | 11/2006 | Amin et al. |
| 7,418,283 B2 | 8/2008 | Amin |
| 7,533,068 B2 | 5/2009 | Maassen van den Brink et al. |
| 7,619,437 B2 | 11/2009 | Thom et al. |
| 7,639,035 B2 | 12/2009 | Berkley |
| 7,898,282 B2 | 3/2011 | Harris et al. |
| 8,008,942 B2 | 8/2011 | van den Brink et al. |

(Continued)

FOREIGN PATENT DOCUMENTS

| | | |
|---|---|---|
| AU | 2010249233 A1 | 6/2011 |
| CA | 2886849 A1 | 10/2016 |

(Continued)

*Primary Examiner* — Farid Homayounmehr
*Assistant Examiner* — Zhimei Zhu
(74) *Attorney, Agent, or Firm* — Michael A. Springs; Moore & Van Allen PLLC; James C. Edwards

(57) ABSTRACT

A system for capturing communication variables associated with a communication between two or more parties and implementing a quantum optimizer to analyze the communication variables to determine the actual context of a communication held by one or more parties to the communication. Once the actual context is determined, a further determination is made as to whether the actual context poses or potentially poses a security threat to one or more parties to the communication or a third-party and, if so, notifies the party of the security threat. In this regard, parties to a communication that are unaware of the actual context of the communication held by another party are made aware of that actual context poses a security threat and, in some embodiments, notifies the parties while the communication is still occurring.

17 Claims, 7 Drawing Sheets

(56) References Cited

U.S. PATENT DOCUMENTS

| | | |
|---|---|---|
| 8,190,548 B2 | 5/2012 | Choi |
| 8,195,596 B2 | 6/2012 | Rose et al. |
| 8,283,943 B2 | 10/2012 | van den Brink et al. |
| 8,421,053 B2 | 4/2013 | Bunyk et al. |
| 8,744,075 B2 | 6/2014 | Tanaka |
| 8,897,449 B1 | 11/2014 | Broadbent |
| 9,165,556 B1* | 10/2015 | Sugar ................. G10L 15/10 |
| 9,207,672 B2 | 12/2015 | Williams et al. |
| 9,246,675 B2 | 1/2016 | Ding |
| 9,400,499 B2 | 7/2016 | Williams et al. |
| 9,537,660 B2 | 1/2017 | Wang et al. |
| 2004/0139000 A1 | 7/2004 | Amos |
| 2005/0010508 A1 | 1/2005 | Groz |
| 2006/0088157 A1 | 4/2006 | Fujii |
| 2006/0251247 A1 | 11/2006 | Akiyama et al. |
| 2007/0273768 A1* | 11/2007 | Tsuchida ............ G06F 1/3203 348/222.1 |
| 2012/0002008 A1 | 1/2012 | Valin et al. |
| 2013/0117200 A1 | 5/2013 | Thom |
| 2014/0214257 A1* | 7/2014 | Williams ............. G05D 1/00 701/25 |
| 2015/0019459 A1* | 1/2015 | Han ................ G06F 3/04883 706/11 |
| 2018/0241647 A1* | 8/2018 | Baracaldo Angel .... H04L 51/22 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

\* cited by examiner

DISTRACTIONAL VARIABLE IDENTIFICATION FOR AUTHENTICATION OF RESOURCE DISTRIBUTION

FIELD OF THE INVENTION

The present invention embraces a system for analyzing contextual information associated with a communication to determine an actual context of a communication. The quantum optimizer is configured to analyze the contextual information to determine an actual context of the communication and whether the perceived context of the communication poses a potential security threat. By employing a quantum optimizer, instead of a classical computer, to verify analyze the contextual information and make the determinations, the system is able to constantly analyze all contextual information associated with communications and determine, in real-time or otherwise, the actual context of the communication.

BACKGROUND

In many instances individuals may be unaware that the communication environment in which they are involved in is not what they perceive it to be. This is because the other party to the communication is attempting an act of deception in order to gain information and/or misappropriate resources from the unknowing individuals or otherwise poses a threat to the unknowing individuals.

Quantum computing involves theoretical computation systems that make direct use of quantum-mechanical phenomena, such as superposition and entanglement, to perform operations on data. Whereas common digital computing, otherwise referred to herein as classical computer apparatus, requires that the data be encoded into binary digits (i.e., bits), each of which is always in one of two definite states (0 or 1), quantum computation uses quantum bits, which can be in superpositions of states. In this regard, quantum computing allows for a more robust computing environment, in which much larger volumes of data can be processed in shorter periods of time than would otherwise be realized by a classical computer apparatus.

Therefore, a need exists to able to able determine the actual context of a communication and, in the event, the actual context of the communication poses a potential security threat to one or more parties to the communication, notify the parties and/or take other appropriate actions to circumvent the potential security threat. Specifically, a need exists to implement quantum computing as a means of constantly analyzing all of the available contextual information associated with various different communication channels to able to identify, in real-time or otherwise, the actual context of a communication and assess the threat posed by the actual context.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, computer program products, methods and the like for implementing a quantum optimizer to determine the actual context of a communication between two or more parties and determine whether the actual context of the communication poses the potential for a security threat to one or more parties to the communication.

The present invention operates under the assumption that in certain instances, a party to a communication may perceive the context of the communication to be different from the actual context/intention of another party to the communication. This may be because one of the parties to the communication is attempting to deceive another party into believing that the context of the communication is different than the actual context of the communication. For example, the deceiving party may be attempting to obtain confidential information from the other party and/or misappropriate financial resources from the other party. However, all too often, human perception is unable to comprehend that the perceived context is different from the actual context of the communication.

The present invention implements a plurality of sensors that capture communication variables associated with a communication (e.g., microphones that capture the audio of a communication, image capturing devices that capture images and/or video of a communication, Optical Character Recognition (OCR) means to capture/read text of a communication and the like). The various communication variables are transmitted to a quantum optimizer which is configured to analyze the communication variables, typically in real-time or near real-time, and determine the actual context of the communication. In this regard, the quantum optimizer may be configured to compare the communication variable to known context patterns to determine the actual context of the communication. For example, known context patterns may be associated with voice patterns that indicate nervousness or truthfulness of the speaker, such certain hesitations and/or inflections in the voice pattern. Additionally, known context patterns may be associated with certain audible or visual distraction techniques (i.e., introducing intentional background noises and/or visuals to distract a party to the communication). Once the actual context of the communication has been determined, a further determination is undertaken to assess whether the actual context poses or potentially poses a security threat to a party to the communication or a third-party to the communication, and, if so, serves to notify the party and/or third-party.

The quantum optimizer is implemented in the present invention to facilitate real-time or near real-time analysis of the communication variables and to insure the accuracy of the resulting actual context determination. By providing for real-time or near real-time processing, the present invention is capable of notifying a party to the communication of the security threat or potential for the security threat while the communication is still occurring. Thus, allowing the party to the communication to avoid further communication (i.e., avoid or at least lessen the security threat). In addition, the level of accuracy imparted by a quantum optimizer limits or eliminates the likelihood of false positives occurring (i.e., determining an inaccurate actual context and subsequently notifying a party of a security threat when in fact no security threat exists).

A system for determining an actual context of a communication defines first embodiments of the invention. The system includes a classical computing apparatus having a memory, at least one processor in communication with the memory, and one or more sensors executable by the processor and configured to capture communication variables associated with an environment in which a communication is occurring and transmit the communication variables to a quantum optimizer. In specific embodiments of the system the sensors may include, but are not limited to, (i) a microphone configured to capture audio of at least one of the communication or the environment in which the communication occurs, (ii) an image capturing device configured to capture at least one of still images of an environment in which a communication occurs or a video stream of the an environment in which a communication occurs, (iii) an optical character recognition sensor configured to capture text in an electronic communication file and (iv) one or device sensors configured to capture a state of a corresponding device associated with the device sensor. In other specific embodiments of the system, the communication may include, but is not limited to, (i) a telephone conversion between two or more parties, (ii) an interaction between one or more parties and a computing device, (iii) a face-to-face communication amongst two or more parties, and (iv) an electronic communication transmitted from one party to one or more parties.

The system further includes a quantum optimizer that is in communication with the classical computer apparatus and includes a quantum memory and a quantum processor in communication with the quantum memory. The quantum processor is configured to receive the communication variables from the classical computing apparatus, and analyze the communication variables to determine an actual context of the communication as held by one or more of communication parties.

Additionally, either classic computing processor(s) or the quantum processor are configured to (i) determine that the actual context of the communication poses at least potential for a security threat to one or more of the communication parties, and (ii) in response to determining that the actual context poses the security threat, transmit an indication of the at least potential for the security threat to the classical computing apparatus.

In specific embodiments of the system, the quantum processor is further configured to analyze the communication variables to determine an actual context of the communication by comparing one or more of the communication variables to predetermined context patterns to determine at least one match between one or more of the communication variables and one or more of the predetermined context patterns. In such embodiments of the system, the quantum processor is further configured to resolve conflict between two or more matches of the one or more communication variables and the predetermined context patterns. In still further related embodiments of the system, the quantum processor is further configured to determine a confidence level to assign to the determined actual context, wherein the confidence level defines an accuracy of the actual context. In such embodiments of the system, either the classical computing processor(s) or the quantum processor is further configured to determine that the actual context of the communication poses a security threat based at least on the confidence level assigned to the actual context.

In other specific embodiments of the system, the classical computing processor(s) is configured to pre-analyze one or more of the captured communication variables to determine that the communication variables require processing by the quantum processor of the quantum optimizer. In such embodiments of the system, transmitting the communication variables to the quantum optimizer occurs based on the determination that the communication variables require processing by the quantum processor.

In still further specific embodiments of the system, (i) capturing the communication variables by the one or more sensors, (ii) transmitting the communication variables to the quantum optimizer, (iii) analyzing the communication variables to determine an actual context of the communication, (iv) determining that the actual context of the communication poses the security threat to one or more of the parties to the communication, and (v) transmitting the indication of the security threat to the classical computing apparatus, occur in real-time or near real-time, such that the indication of the security threat is transmitted to a classical computing device associated with the one or more parties to the communication while the communication is occurring.

In additional embodiments of the system, the classical computing apparatus includes a mobile communication device having a communication context determining application stored in the memory and executable by the processor. The application is configured to (i) receive a user input that activates the one or more sensors to capture the communication variables associated with the environment in which the user is a party to the communication, (ii) and transmit the communication variables to the quantum optimizer, and (iii) in response to the quantum optimizer determining an actual context of the communication and (iv) the actual context poses at least the potential for the security threat, receive the indication of the at least the potential of the security threat. In specific related embodiments of the system, the communication context determining application is further configured to receive the indication while the communication is occurring.

A computer program product for determining an actual context of a communication defines second embodiments of the invention. The computer program product includes a non-transitory computer-readable storage medium having computer-executable instructions. The instructions are configured for capturing communication variables associated with an environment in which a communication is occurring and transmitting the communication variables to a quantum optimizer and, in response to transferring the communication variables to the quantum optimizer, receiving an indication that an actual context of the communication held by one or more parties to the communication poses at least a potential for a security threat. The quantum optimizer is configured for receiving the communication variables and analyzing the communication variables to determine an actual context of the communication as held by one or more of communication parties. Moreover, either the computer-readable storage medium further includes computer-executable instructions or the quantum optimizer is configured for determining that the actual context of the communication poses at least potential for a security threat to one or more of the parties to the communication, and in response to determining that the actual context poses the security threat, transmitting the indication that the actual context of the communication held by the one or more parties to the communication poses at least the potential for the security threat.

In specific embodiments of the computer program product, the computer-readable storage medium further includes computer-executable instructions for pre-analyzing one or more of the captured communication variables to determine that the communication variables require processing by the quantum optimizer.

A method for determining an actual context of a communication defines third embodiments of the invention. The method includes capturing, by a classical computing device processor, communication variables associated with an environment in which a communication is occurring and transmitting, by the classical computing device processor, the communication variables to a quantum optimizer. The method further includes receiving, by the quantum optimized device processor, the communication variables and analyzing, by the quantum optimizer device, the communication variables to determine an actual context of the communication as held by one or more of communication parties. In addition, the method includes determining, by the classical computing device processor or the quantum optimizer device, that the actual context of the communication poses at least potential for a security threat to one or more of the parties to the communication, and, in response to determining that the actual context poses the security threat, transmitting, by the classical computing device processor or the quantum optimizer, an indication of the at least potential for the security threat.

In further specific embodiments of the method, analyzing further comprises comparing, by the quantum optimizer device, one or more of the communication variables to predetermined context patterns to determine at least one match between one or more of the communication variables and one or more of the predetermined context patterns. In such embodiments the method may further include resolving, by the quantum optimizer device, conflict between two or more matches of the one or more communication variables and the predetermined context patterns.

In further related embodiments the method includes determining, by the quantum optimizer device, a confidence level to assign to the determined actual context. The confidence level defines an accuracy of the actual context. In such embodiments of the method, the classical computing device processor or the quantum device is further configured to determine that the actual context of the communication poses a security threat based at least on the confidence level assigned to the actual context.

In still further embodiments the method includes pre-analyzing, by the classical computing device processor, one or more of the captured communication variables to determine that the communication variables require processing by the quantum processor of the quantum optimizer. In such embodiments of the method, transmitting the communication variables to the quantum optimizer occurs based on the determination that the communication variables require processing by the quantum processor.

Thus, systems, apparatus, methods, and computer program products herein described in detail below provide for implementing a quantum optimizer to analyze communication variables to determine the actual context of a communication held by one or more parties to the communication. Once the actual context is determined, a determination is made as to whether the actual context poses or potentially poses a security threat to one or more parties to the communication or a third-party and, if so, notifies the party of the security threat. In this regard, parties to a communication that are unaware of the actual context of the communication held by another party are made aware of the actual context and, in some embodiments, while the communication is still occurring.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
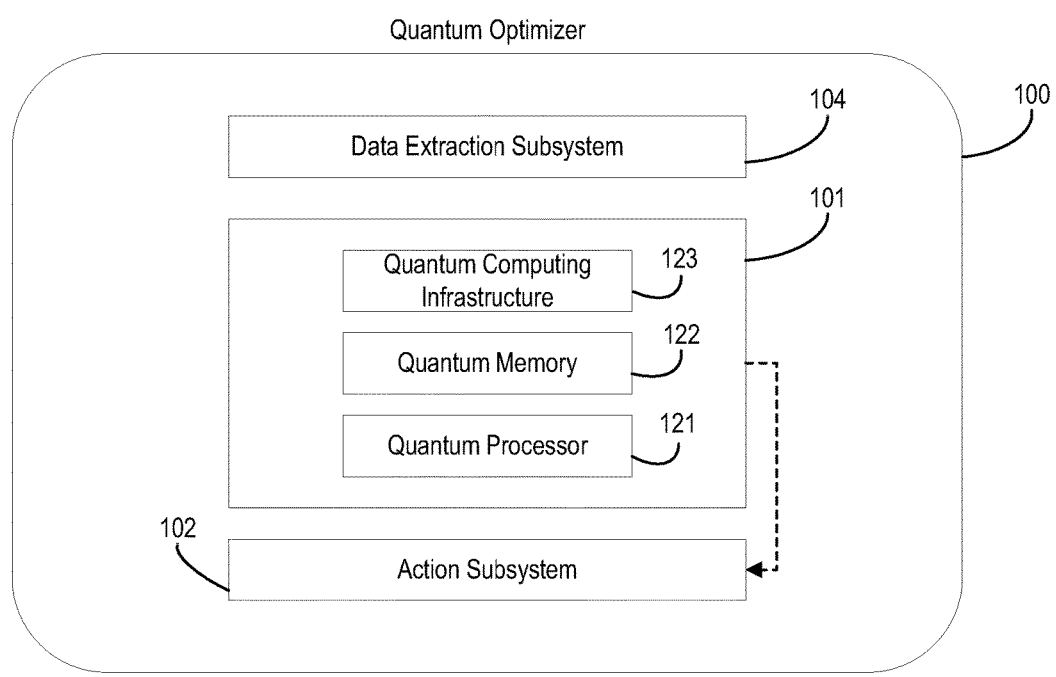
Figure 2:
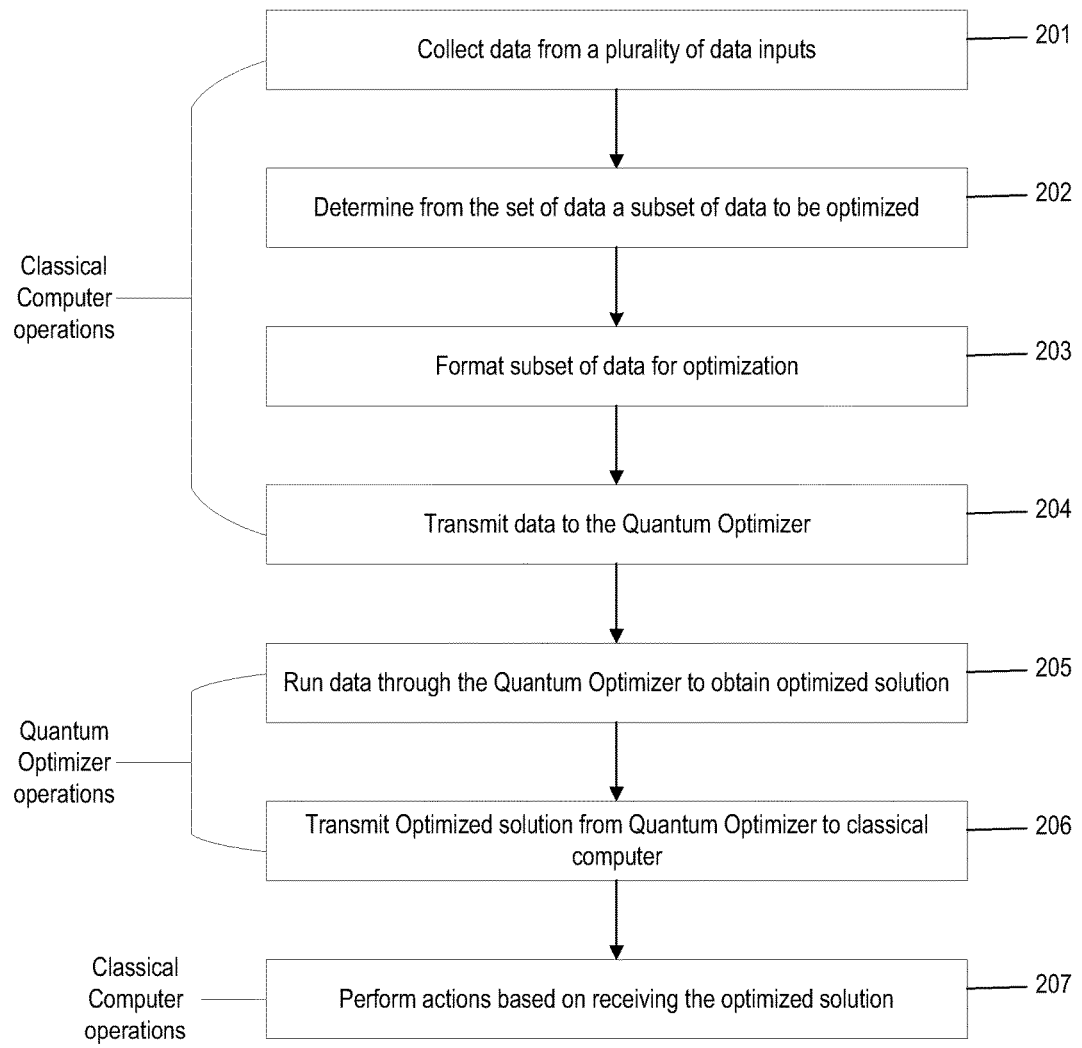
Figure 3:
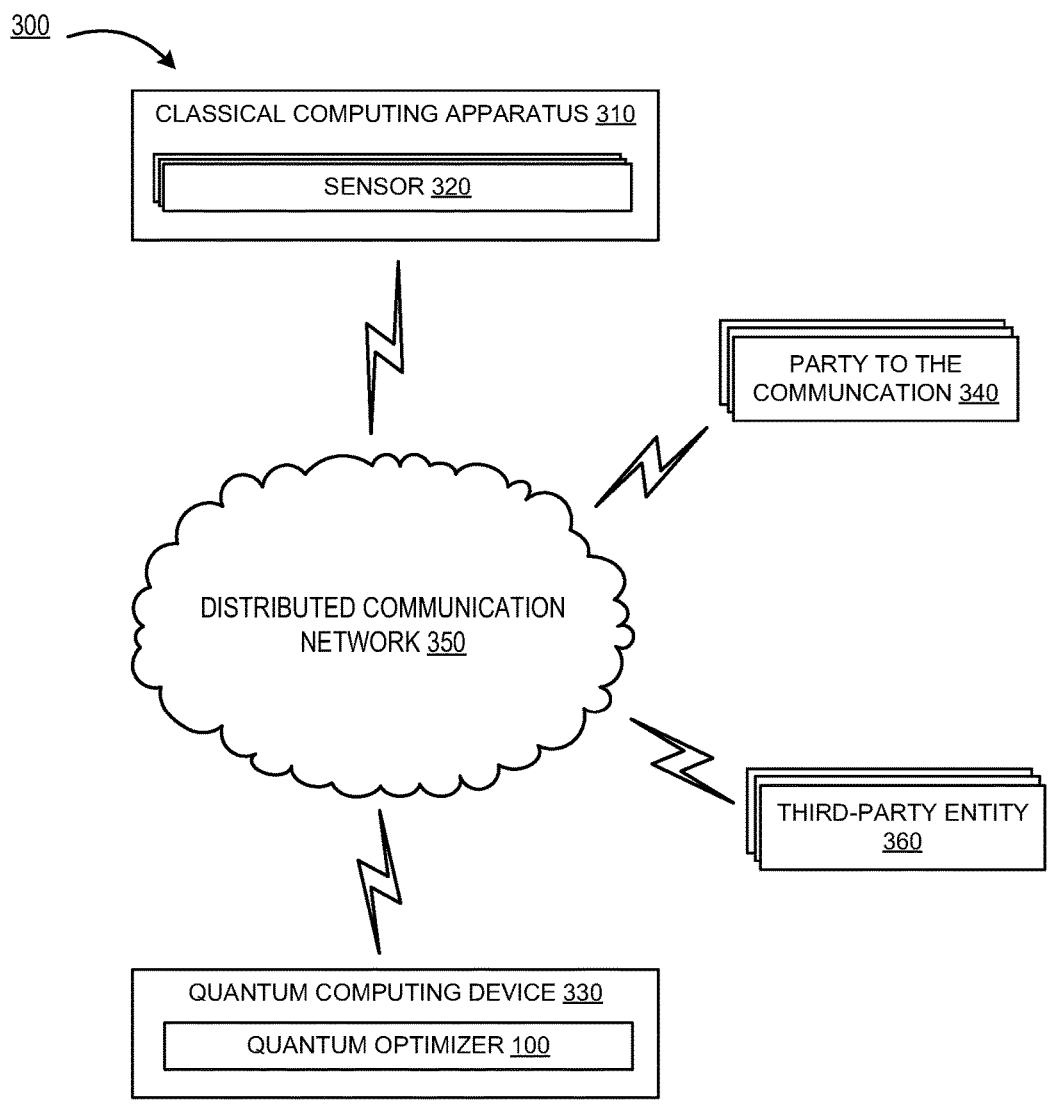
Figure 4:
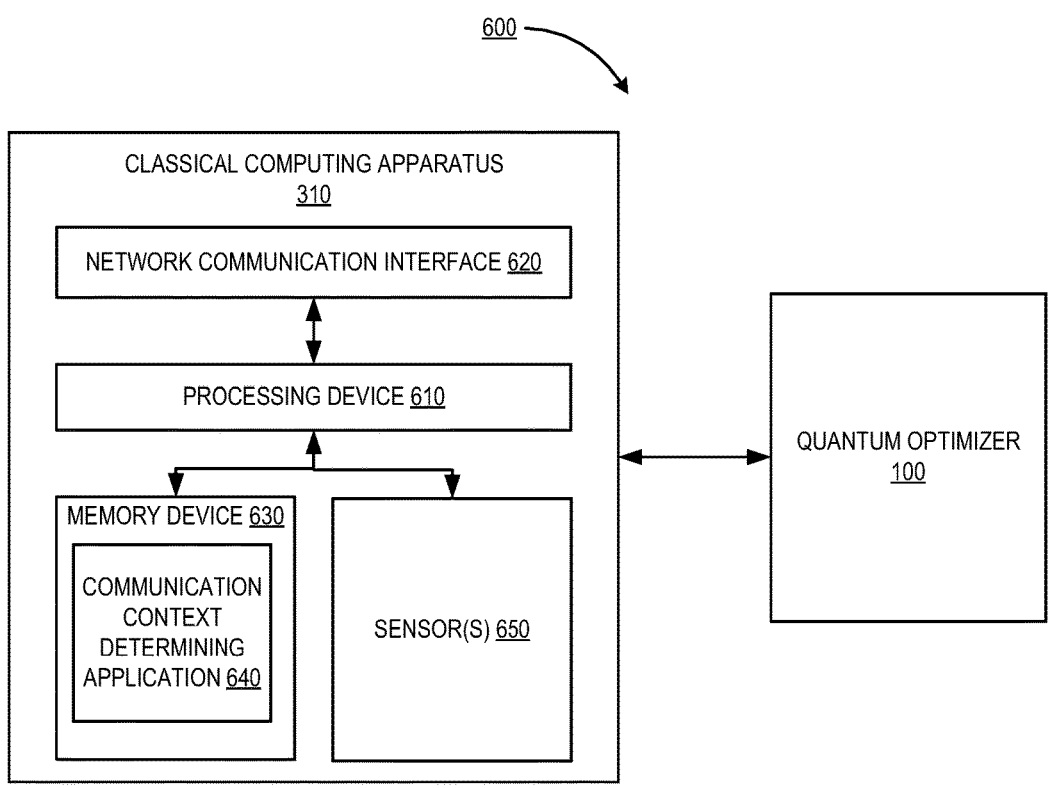
Figure 5:
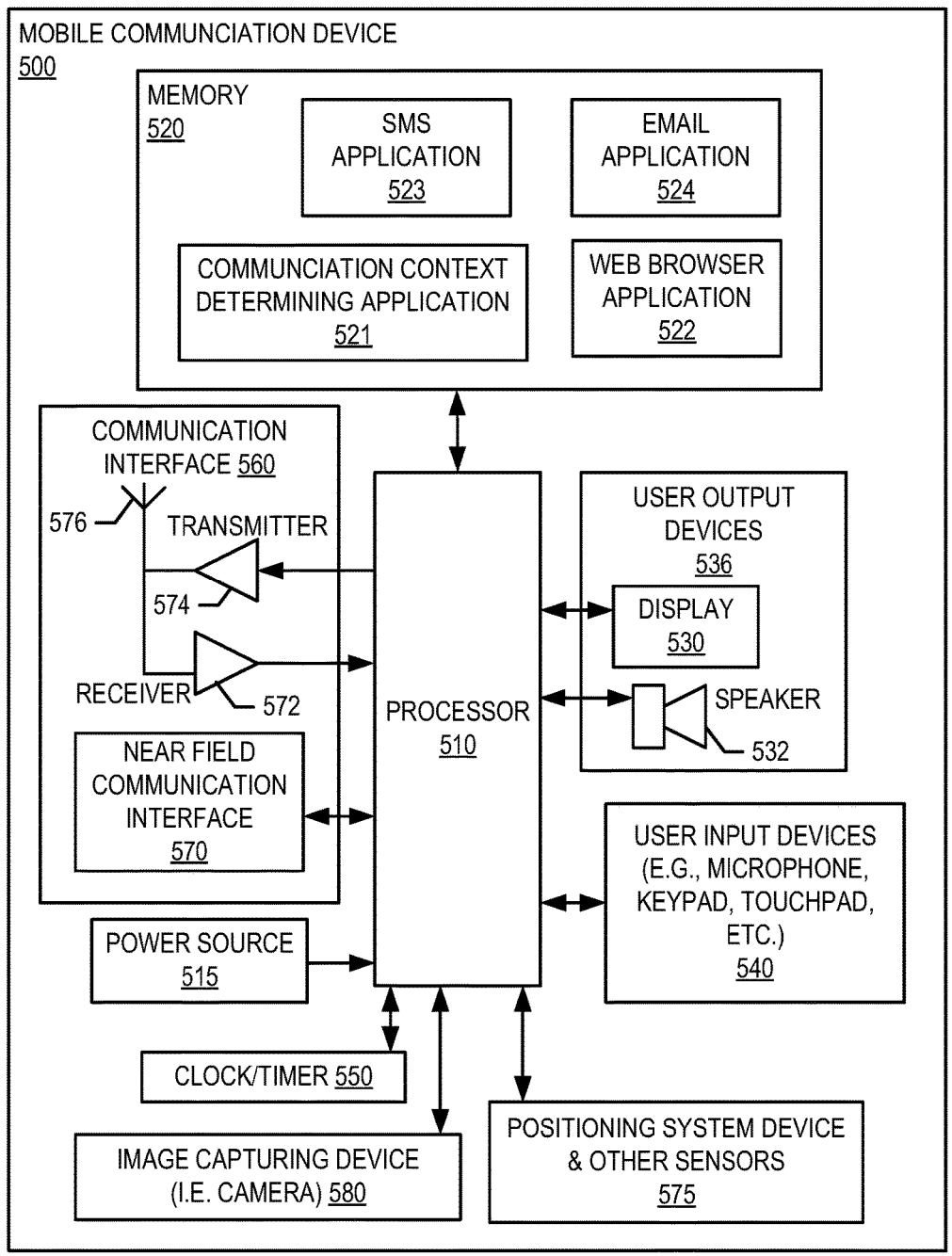
Figure 6A:
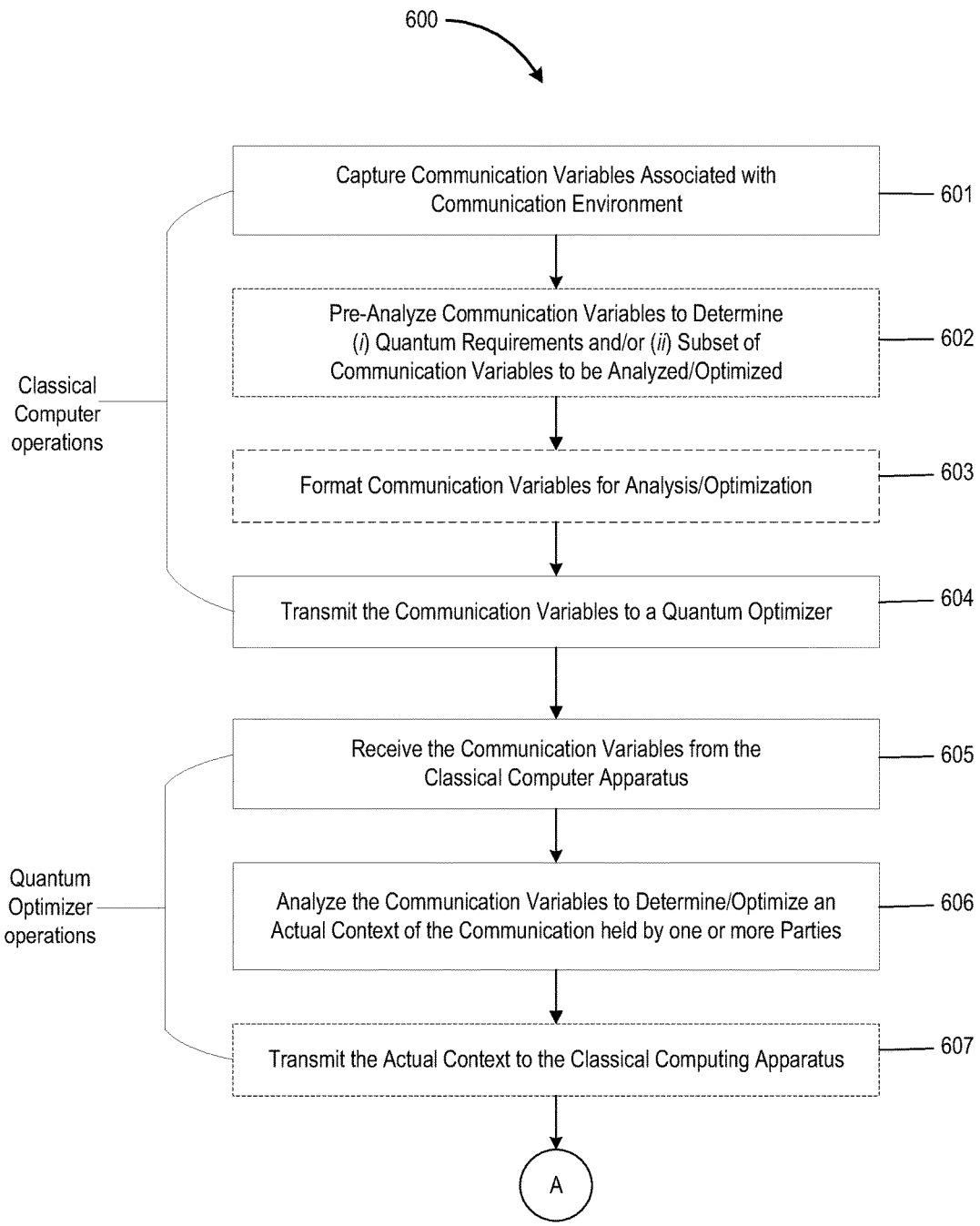
Figure 6B:
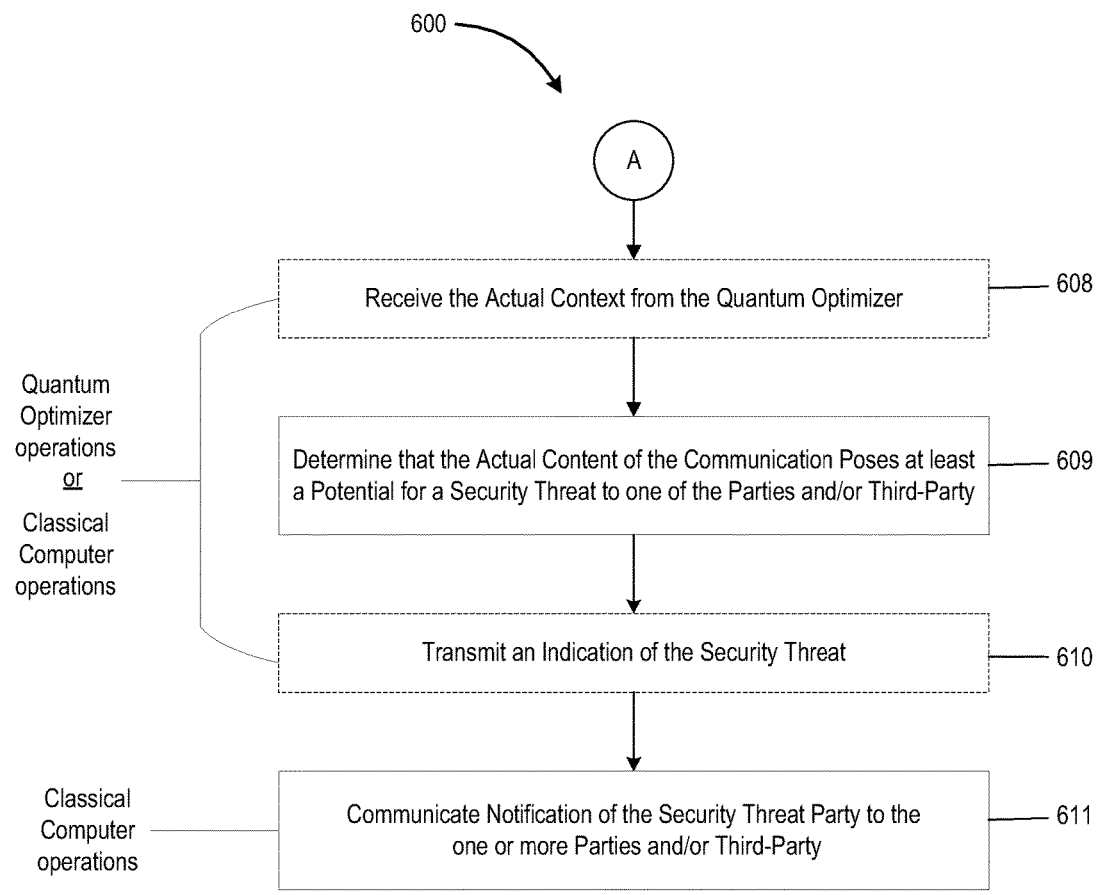

Having thus described embodiments of the invention in general terms, reference will now be made the accompanying drawings, wherein:

FIG. 1 is a schematic diagram of an exemplary quantum optimizer that can be used in parallel with a classical computer to solve optimization problems;

FIG. 2 depicts a method of solving optimization problems by using a classical computer in conjunction with a quantum optimizer;

FIG. 3 depicts an operating environment in accordance with an aspect of the present invention;

FIG. 4 schematically depicts a system for determining an actual context of a communication, in accordance with an aspect of the present invention;

FIG. 5 is a schematic diagram of classical computing device comprising a mobile communication device, in accordance with embodiments of the present invention; and FIGS. 6A-6B depict a method for determining an actual context of a communication in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for implementing a quantum optimizer to determine the actual context of a communication between two or more parties and determine whether the actual context of the communication poses the potential for a security threat to one or more parties to the communication and/or third party entities associated with the communication.

The present invention operates under the assumption that in certain instances, a party to a communication may perceive the context of the communication to be different from the actual context/intention of another party to the communication. This may be because one of the parties to the communication is attempting to deceive another party into believing that the context of the communication is different than the actual context of the communication. For example, the deceiving party may be attempting to obtain confidential information from the other party and/or misappropriate financial resources from the other party. However, all too often, human perception is unable to comprehend that the perceived context is different from the actual context of the communication. In accordance with embodiments of the invention, the communication may be, but is not limited to, (i) a telephone conversion between two or more parties, (ii) an interaction between one or more parties and a computing device, (iii) a face-to-face communication amongst two or more parties, and (iv) an electronic communication transmitted from one party to one or more parties. The present invention implements a plurality of sensors that capture communication variables associated with a communication (e.g., microphones that capture the audio of a communication, image capturing devices that capture images and/or video of a communication, Optical Character Recognition (OCR) means to capture/read text of a communication and the like). The various communication variables are transmitted to a quantum optimizer which is configured to analyze the communication variables, typically in real-time or near real-time, and determine the actual context of the communication. In this regard, the quantum optimizer may be configured to compare the communication variable to known context patterns to determine the actual context of the communication. For example, known context patterns may be associated with voice patterns that indicate nervousness or truthfulness of the speaker, such certain hesitations and/or inflections in the voice pattern. Additionally, known context patterns may be associated with certain audible or visual distraction techniques (i.e., introducing intentional background noises and/or visuals to distract a party to the communication). Once the actual context of the communication has been determined, a further determination is undertaken to assess whether the actual context poses or potentially poses a security threat to a party to the communication or a third-party to the communication, and, if so, serves to notify the party and/or third-party.

The quantum optimizer is implemented in the present invention to facilitate real-time or near real-time analysis of the communication variables and to insure the accuracy of the resulting actual context determination. By providing for real-time or near real-time processing, the present invention is capable of notifying a party to the communication of the security threat or potential for the security threat while the communication is still occurring. Thus, allowing the party to the communication to avoid further communication (i.e., avoid or at least lessen the security threat). In addition, the level of accuracy imparted by a quantum optimizer limits or eliminates the likelihood of false positives occurring (i.e., determining an inaccurate actual context and subsequently notifying a party of a security threat when in fact no security threat exists).

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real-time or near real-time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated by reference as if set forth fully herein.

FIG. 1 is a schematic diagram of an exemplary quantum optimizer 100 that can be used in parallel with a classical computer to solve optimization problems. The quantum optimizer 100 typically includes a data extraction subsystem 104, a quantum computing subsystem 101, and an action subsystem 105. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the data extraction subsystem 104 communicates with the network to extract data for optimization. It will be understood that any method of communication between the data extraction subsystem 104 and the network is sufficient, including but not limited to wired communication, Radiofrequency (RF) communication, BLUETOOTH®, WIFI®, and the like. The data extraction subsystem 104 then formats the data for optimization in the quantum computing subsystem. In accordance with embodiments of the present invention data extraction subsystem 104 may be configured to extract communication variables from sensors and format the communication variables for optimization (i.e., analysis to determine actual context).

As further depicted in FIG. 1, the quantum computing subsystem 101 includes a quantum computing infrastructure 123, a quantum memory 122, and a quantum processor 121. The quantum computing infrastructure 123 includes physical components for housing the quantum processor 121 and the quantum memory 122. The quantum computer infrastructure 123 further includes a cryogenic refrigeration system to keep the quantum computing subsystem 101 at the desired operating temperatures. In general, the quantum processor 121 is designed to perform adiabatic quantum computation and/or quantum annealing to optimize data received from the data extraction subsystem 104. In accordance with embodiments of the present invention, the quantum processor is configured to analyze the communication variables to determine an actual context of a communication held by one or more parties to the communication.

The quantum memory 122 typically includes a plurality of qubits used for storing data during operation of the quantum computing subsystem 101. In general, qubits are any two-state quantum mechanical system. It will be understood that the quantum memory 122 may include any such two-state quantum mechanical system, such as the polarization of a single photon, the spin of an electron, and the like.

The action subsystem 102 communicates the optimized data from the quantum computing subsystem 101 over the network. In embodiments of the present invention, the action subsystem 102 may communicate the determined actual context and/or, in some embodiments of the invention an indication that the actual context poses or potentially poses a threat to one of the parties to the communication or a third-party associated with the communication. It will be understood that any method of communication between the action subsystem 102 and the network is sufficient, including but not limited to wired communication, Radiofrequency (RF) communication, BLUETOOTH®, WIFI®, and the like.

FIG. 2 depicts a method of solving optimization problems by using a classical computer in conjunction with a quantum optimizer. As depicted in FIG. 2, a classical computer begins the method at event 201 by collecting data from a plurality of inputs. In accordance with embodiments of the present invention, capturing communication variables from a plurality of sensors. At event 202, the classical computer then determines from the set of data collected at event 201 a subset a data to be optimized. In accordance with embodiments of the invention, the classical computer pre-analyzes the variables to determine whether quantum optimization is warranted and/or which communication variables are relevant for quantum optimization.

The classical computer then formats the subset of data for optimization at event 203. At event 204, the classical computer transmits the formatted subset of data to the quantum optimizer. The quantum optimizer runs the data to obtain the optimized solution at 205. In accordance with embodiments of the present invention, analyzes the communication variables to determine an actual context of a communication held by one or more parties to the communication. The quantum optimizer then transmits the optimized data back to the classical computer at event 206. Finally, the classical computer can perform actions based on receiving the optimized solution at event 207.

In accordance with embodiments of the present invention, determining an actual context of a communication and subsequently notifying a party or parties to the communication or third-parties associated with the communication of a security threat associated with the actual context occurs in real-time or near-real time. In such embodiments of the invention, the party or parties to the communication or third-parties may be notified while the communication is occurring, thus, allowing for the party/parties and/or third-party to prevent the security threat, such as by ending the communication or the like. Real-time or near-real time processing is made possible through implementation of the quantum optimizer which is capable of processing/analyzing a vast amount and combination of communication variables as they are received by the quantum optimizer (i.e., in real-time or near real-time).

In accordance with other embodiments of the present invention, determining an actual context of a communication and subsequently notifying a party or parties to the communication or third-parties associated with the communication of a security threat associated with the actual context may occur at a later point in time (i.e., after completion of the communication) based on circumstances that dictate such (e.g., the communication has become a communication of interest).

FIG. 3 provides a block diagram illustrating an operating environment 300, in accordance with an embodiment of the present invention. As illustrated in FIG. 3, the operating environment 300 typically includes a classical computing apparatus 310 and a quantum computing device 330. The classical computing apparatus 310 which will typically include a plurality of classical computing devices includes one or more, typically a plurality of sensors 320 configured for capturing communication variables associated with a communication and/or communication environment. The sensors, which comprise microphones, image-capturing devices (e.g., cameras), OCR devices, location determining devices, clocks and the like, may be stand-alone devices or may be included within another classical computing device, such as within a mobile communication device or the like.

The classical computing device 310 is configured to transmit/communicate the captured communication variables over a network 350 to the quantum computing device 330 for processing by the quantum optimizer 100. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network.

The quantum optimizer 100 is configured to analyze the communication variables to determine a actual context of a communication held by one or more parties to the communication and, in some embodiments of the invention, determine that the actual context poses a security threat or a potential security threat to one or more parties to the communication and/or a third party associated with the communication and provide an indication of the security threat to the classical computing apparatus 310. In turn, the classical computing apparatus 310 is configured to generate and initiate communication of a notification/alert to one or more parties to the communication 340 and/or one or more third-party entities 360 associated with the communication. In alternate embodiments of the invention, the quantum optimizer 100 is configured to transmit/communicate the actual context of the communication to the classical computing apparatus 310. In turn, the classical computing apparatus 310 is configured to determine that the actual context poses a security threat or a potential security threat to one or more parties to the communication and/or a third party associated with the communication and generate and initiate communication of a notification/alert to one or more parties to the communication 340 and/or one or more third-party entities 360 associated with the communication.

Referring now to FIG. 4, classical computing apparatus 310 includes various features, such as a network communication interface 620, a processing device 610, a memory device 630 and sensors 650. The network communication interface 620 includes a device that allows the classical computing apparatus 310 to communicate over the network 350 (shown in FIG. 3).

As used herein, a "processing device," such as the processing device 610, generally refers to a device or combination of devices having circuitry used for implementing the communication and/or logic functions of a particular system. For example, a processing device 610 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 610 may further include functionality to operate one or more software programs based on computer-executable program code thereof, which may be stored in a memory. As the phrase is used herein, a processing device 610 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" 630 generally refers to a device or combination of devices that store one or more forms of computer-readable media for storing data and/or computer-executable program code/instructions. Computer-readable media is defined in greater detail below. For example, in one embodiment, the memory device 630 includes any computer memory that provides an actual or virtual space to temporarily or permanently store data and/or commands provided to the processing device 610 when it carries out its functions described herein.

In one embodiment of the invention, a communication context determining application 640 stored in memory 630 is configured to determine an actual context of communication and receive notification of a security threat associated with the actual context. In this regard, the communication context determining application 640 is typically in communication with a quantum optimizer 670. The quantum optimizer is typically configured to perform analysis of the communication variables captured by sensors 650 to determine an actual context of a communication as held by one or more parties to the communication as described herein. An exemplary quantum optimizer is depicted in more detail in FIG. 1.

Referring to FIG. 5 a block diagram is provided that depicts a classical computing device in the form of a mobile communication device 500, in accordance with embodiments of the invention. The mobile communication device 500, may comprise a mobile telephone, a portable digital assistant (PDAs), pager, mobile television, gaming device, laptop computer, camera, video recorder, audio/video player, radio, GPS device, or any combination of the aforementioned.

In such embodiments of the invention, the mobile communication device 500 may include one or more of the sensors (described below) that are configured to capture communication variables associated with the environment of a communication. In other specific embodiments of the invention, the mobile communication device may include a communication context determining application 521 configured to determine the actual context of an ongoing communication and notify the user of a security threat associated with the actual context.

The mobile communication device 500 typically includes a processor 510 communicably coupled to such devices as a memory 520, user output devices 536, user input devices 540 (e.g., a microphone), a communication interface 560, a power source 515, a clock or other timer 550, a camera 580, and a positioning system device and other sensors 575. The clock 550, camera 580, microphone 540, and positioning system device and other sensors 575 may serve as sensors for capturing communication variables associated with a communication environment, such as time of the communication, location of the communication and audio/video of the communication.

The processor 510, and other processors described herein, typically includes circuitry for implementing communication and/or logic functions of the mobile communication device 500. For example, the processor 510 may include a digital signal processor device, a microprocessor device, and various analog to digital converters, digital to analog converters, and/or other support circuits. Control and signal processing functions of the mobile communication device 500 are allocated between these devices according to their respective capabilities. The processor 510 thus may also include the functionality to encode and interleave messages and data prior to modulation and transmission. The processor 510 can additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the mobile communication device 500 to transmit and receive web content, such as, for example, location-based content and/or other web page content, according to a Wireless Application Protocol (WAP), Hypertext Transfer Protocol (HTTP), and/or the like.

The processor 510 is typically configured to use the communication interface 560 to communicate with one or more other devices on the network 350. In this regard, the communication interface 560 typically includes an antenna 576 operatively coupled to a transmitter 574 and a receiver 572 (together a "transceiver"). The processor 510 is typically configured to provide signals to and receive signals from the transmitter 574 and receiver 572, respectively. The signals may include signaling information in accordance with the air interface standard of the applicable cellular system of the wireless telephone network. In this regard, the mobile communication device 500 may be configured to operate with one or more air interface standards, communication protocols, modulation types, and access types. By way of illustration, the mobile communication device 500 may be configured to operate in accordance with any of a number of first, second, third, and/or fourth-generation communication protocols and/or the like. For example, the mobile communication device 500 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile communication device 500 may also be configured to operate in accordance with non-cellular communication mechanisms, such as via a wireless local area network (WLAN) or other communication/data networks.

The communication interface 560 may also include a near field communication (NFC) interface 570. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 570 may include a smart card, key card, proximity card, Bluetooth® device, radio frequency identification (RFID) tag and/or reader, transmitter, receiver, and/or the like. In some embodiments, the NFC interface 570 communicates information via radio, infrared (IR), and/or optical transmissions. In some embodiments, the NFC interface 570 is configured to operate as an NFC transmitter and/or as an NFC receiver (e.g., an NFC reader). Also, it will be understood that the NFC interface 570 may be embedded, built, carried, and/or otherwise supported in and/or on the mobile communication device 500. In some embodiments, the NFC interface 570 is not supported in and/or on the mobile communication device 500, but the NFC interface 570 is otherwise operatively connected to the mobile communication device 500 (e.g., where the NFC interface 570 is a peripheral device plugged into the mobile communication device 500). Other apparatuses having NFC interfaces mentioned herein may be configured similarly. In some embodiments, the NFC interface 570 of the mobile communication device 500 is configured to contactlessly and/or wirelessly communicate information to and/or from a corresponding NFC interface of another apparatus (e.g., another mobile or computing device).

The mobile communication device 500 typically has a user interface that is, like other user interfaces described herein, made up of user output devices 536 and/or user input devices 540. The user output devices 536 include a display 530 (e.g., a liquid crystal display or the like) and a speaker 532 or other audio device, which are operatively coupled to the processor 510. The user input devices 540, which allow the mobile communication device 500 to receive data from a user, may include any of a number of devices allowing the mobile communication device 500 to receive data from a user, such as a keypad, keyboard, touch-screen, touchpad, microphone, mouse, joystick, other pointer device, button, soft key, and/or other input device(s).

The mobile communication device 500 may also include a positioning system device 575 that is configured to be used by a positioning system to determine a location of the mobile communication device 500. For example, the positioning system device 575 may include a GPS transceiver. In some embodiments, the positioning system device 575 is at least partially made up of the antenna 576, transmitter 574, and receiver 572 described above. For example, in one embodiment, triangulation of cellular signals may be used to identify the approximate location of the mobile communication device 500. In other embodiments, the positioning system device 575 includes a proximity sensor or transmitter, such as an RFID tag, that can sense or be sensed by devices known to be located proximate a location to determine that the mobile communication device 500 is located proximate these known devices.

The mobile communication device 500 further includes a power source 515, such as a battery, for powering various circuits and other devices that are used to operate the mobile communication device 500. Embodiments of the mobile communication device 500 may also include a clock or other timer 550 configured to determine and, in some cases, communicate actual or relative time to the processor 510 or one or more other devices.

The mobile communication device 500 also includes a memory 520 operatively coupled to the processor 510. As used herein, memory includes any computer readable medium (as defined herein below) configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory can additionally or alternatively include an electrically erasable programmable read-only memory (EEPROM), flash memory or the like.

The memory 520 can store any of a number of applications which include computer-executable instructions/code executed by the processor 510 to implement the functions of the mobile communication device 500 described herein. For example, the memory 520 may include such applications as a conventional web browser application 522. These applications also typically provide a graphical user interface (GUI) on the display 530 that allows the user to communicate with the mobile communication device 500, and/or other devices or systems.

In accordance with specific embodiments of the invention, the memory 520 stores communication context determining application 521 that is configured to determine the actual context of a communication as held by a party (i.e., a party other than the user of the mobile communication device 500) and notify the user of security threats associated with the actual context. In this regard, context determining application 521 may provide the user a GUI configured to receive user input that activates one or more of the sensors (e.g., microphone 540, image capturing device 580, position determining device & other sensors 575 or the like) to capture communication variables associated with a communication environment. For example, a user that is or is about to enter into a face-to-face communication with another party that they are unfamiliar with may desire to determine if the intent/context of the other party is different than what they perceive the intent/context to be (in other words, the user may desire to determine if the actual context of the other party is deceptive/dishonest so as to pose a security threat to the user). The user input may activate a predetermined configuration of sensors or the user input may select which sensors to activate.

Once the communication variables have been captured, communication context determining application 521 transmits the communication variables to the quantum optimizer, which, in turn, analyzes the communication variables to determine an actual context of the communication held by the opposing party. If the actual context is determined to pose a security threat (or the potential for a security threat), a notification/indication is transmitted to the communication context determining application 521 and is communicated to the user via user output device 536. For example, a notification may be displayed on display 530 indicating a security threat and/or the speaker 532 may provide a predetermined audible sound that the user recognizes as being associated with a communication security threat.

The memory 520 can also store any of a number of pieces of information, and data, used by the mobile communication device 500 and the applications and devices that make up the mobile communication device 500 or are in communication with the mobile communication device 500 to implement the functions of the mobile communication device 500 and/or the other systems described herein. For example, the memory 520 may include such data as user authentication information.

Referring now to FIGS. 6A-6B a method 600 is provided for determining an actual context of a communication, in accordance with embodiments of the invention. As previously discussed the communication may be, but is not limited to, (i) a telephone conversion between two or more parties, (ii) an interaction between one or more parties and a computing device, (e.g., a transaction at an Automated Teller Machine), (iii) a face-to-face communication amongst two or more parties, and (iv) an electronic communication transmitted from one party to one or more parties (e.g., an email or the like).

Initially, at event 601, the classical computer (e.g., a binary, digital electronic computer), captures communication variables associated with the communication and/or communication environment. In this regard, the classical computer relies on one or more sensors to capture the communication variables, otherwise referred to as parameters or attributes. As previously noted the sensors may comprise, but are not limited to, microphones that capture the audio of a communication (e.g., the audio of telephone or live face-to-face communication), image capturing devices that capture images and/or video of a communication (e.g., the video of a face-to-face communication or the interaction of a party with a computing device), Optical Character Recognition (OCR) means to capture/read text of a communication (e.g., read the text of the email or the like), other sensors within a device associated with a party to the communication (e.g., sensors within a mobile communication device that indicate the current state of the device and/or environment) and the like). It should be noted that the processing capabilities of the quantum optimizer allow for the sensors to capture and transmit the communication variables to the quantum optimizer on a continuous basis, regardless of the volume of communications and/or the duration a communication.

At optional event 602, the communication variables are pre-analyzed at the classical computing level. Such pre-analyzing of the communication variable may be conducted to determine if the communication variables require quantum optimization (i.e., whether the communication variables are capable of being analyzed by the quantum computing device to determine an actual context and/or whether the pre-analysis is sufficient to determine an actual context of the communication, thus obviating the need for quantum optimizer analysis). In other embodiments of the invention, pre-analysis is performed to determine a subset of the communication variables that require quantum optimization.

For example, the subset of communication variables may comprise only the portion of the audio or video file that contains the actual communication or only the portion of the actual communication that is relevant to determining an actual context (e.g., only the portions in which the party in question is communicating).

At optional event 603, the communication variables may be formatted by the classical computing apparatus in a format conducive to subsequent quantum optimization/processing and, at event 604, the communications variables are transmitted to the quantum optimizer. As previously discussed the communication variables may be transmitted continuously, as captured, for a given communication, such that the analysis by the quantum optimizer occurs in real-time or near real-time, in order for the actual context of the communication to occur while the communication is occurring. Such real-time or near real-time determination of the actual context and potential security threats allows for parties to the communication or associated third-parties to be notified of the potential security threat while the communication is ongoing. Thus, providing the party to the communication the ability to avoid the security threat.

At event 605, the quantum optimizer receives the communication variables from the classical computer apparatus and, at event 606 analyzes the communication variables to determine an actual context of the communication held by one or more parties to the communication. The actual context may be consistent with or may deviate from the perceived context of one or more parties to the communication. In other words, a party to the communication may perceive that a communication is being conducted with their best interests in mind, while the actual context is that the party is being deceived by one or more other parties to the communication. Such deception may involve attempting to receive confidential/non-public information and/or misappropriate financial resources.

In specific embodiments of the invention, the quantum optimizer is configured to compare the communication variables to predetermined context patterns to determine matches between the communication variables and the predetermined context patterns. For example, the audio file may be analyzed to determine matches between portions of the audio file and predetermined audio patterns that indicate an actual context (e.g., voice patterns, such as hesitations and inflections that would indicate a likelihood of deception/dishonesty) or the video file may be analyzed to determine matches between portions of the video file and predetermined video patterns that indicate the actual context (e.g., physical mannerisms of a party to the communication that would indicate a likelihood of deception/dishonesty). It should be noted that the predetermined context patterns may not only indicate deception/dishonesty, but also may indicate lack of deception/honesty (i.e., the actual context of the communication being consistent with the perceived context of the communication). In addition, patterns may consist of a predetermined number of similar communications occurring substantially simultaneously or within a predetermined period of time. The predetermined context patterns may be learned over time based on communications that have, in fact, been verified as being deceptive/dishonest communications.

In such embodiments of the invention, the quantum optimizer, or in some embodiments the classical computing apparatus, may be further configured to resolve conflict between matches of the communication variables and predetermined context patterns. Conflict exists when one or more matches indicate deception/dishonesty while one or more other matches may indicate lack of deception/dishonesty. In such embodiments of the invention, a rules engine may be employed to resolve the conflict.

In other specific embodiments of the invention, the quantum optimizer, or in some embodiments the classical computing apparatus, may be further configured to determine a confidence level to assign the determined actual context. The confidence level may take into account the type/nature of the matched context patterns (i.e., some of the matched context patterns being deemed more indicative of an actual context than others). In addition, the confidence level may take into account conflicting matches (i.e., some of the matches for a given communication indicate deception/dishonesty, while others indicate a lack of deception/dishonesty). A weighting system may be implemented to assess the relative importance of a matched context pattern in terms of indicating the actual context of the communication.

At optional event 607, if subsequent processing is performed by the classical computing apparatus, the actual context is transmitted from the quantum optimizer to the classical computing and, at optional event 608, the classical computing apparatus receives the actual context (if the subsequent processing is performed by the quantum optimizer, events 607 and 608 are obviated and omitted).

At Event 609, the quantum optimizer or the classical computing device, determines that the actual context of the communication poses at least the potential for a security threat to a party of the communication or a third-party associated with the communication. In specific embodiments of the invention, the actual context may be consistent with the perceived context and therefore no security threat may be evident. In other embodiments of the invention, the actual context may differ from the perceived context and the actual context may be associated with one or more predetermined security threats. In other embodiments of the invention determining whether the actual context poses a security threat may depend upon the accuracy of the determined actual context. In this regard, in those embodiments of the invention in which a confidence level is determined, the confidence level may be used to determine if a security threat is posed. For example, the confidence level of the determined actual context may need to reach or exceed a predetermined threshold for a positive determination of a security threat. As such, through use of a confidence level or some other means of determining accuracy of the actual context, the invention guards against false-positives (i.e., a party to a communication being notified of a security threat, when in fact, no security threat exists).

At optional event 610, if the security threat is determined by the quantum optimizer, the quantum computing device transmits the indication of the security threat to the classical computing apparatus. At event 611, the classical computing apparatus, generates and communicates a notification of the security threat to a party to the communication or a third-party associated with the communication. In specific embodiments of the invention, the processing occurs in real-time or near real-time, such that, the notification is communicated to a party during the communication. As such, the party to the communication can be afforded the opportunity to end the communication and, thereby, lessen or eliminate the security threat. In other embodiments of the invention, in which the communication variables are processed after the capturing of the communication variables, the communication of the notification may occur at a later point in time (i.e., not in real-time or near real-time).

As evident from the preceding description, the system described herein represents an improvement in technology by implementing a quantum optimizer to analyze communication variables to determine the actual context of a communication held by one or more parties to the communication. Once the actual context is determined, a determination is made as to whether the actual context poses or potentially poses a security threat to one or more parties to the communication or a third-party and, if so, notifies the party of the security threat. In this regard, parties to a communication that are unaware of the actual context of the communication held by another party are made aware of the actual context and, in some embodiments, while the communication is still occurring.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for determining an actual context of a communication, comprising:
    a classical computing apparatus comprising:
        a memory,
        at least one processor in communication with the memory, and
        one or more sensors executable by the processor and configured to:
            capture communication variables associated with an environment in which a communication is occurring,
            pre-analyze one or more of the captured communication variables to (i) determine whether the communication variables are capable of being analyzed by the quantum computing device to determine an actual context and (ii) in response to determining that the communication variables are capable of being analyzed by the quantum computing device, determine a subset of communication variables from the captured communication variables that require processing by the quantum processor of the quantum optimizer, and
            transmit the subset of communication variables to a quantum optimizer; and
    the quantum optimizer in communication with the classical computer apparatus, the quantum optimizer comprising:
        a quantum memory,
        a quantum processor in communication with the quantum memory and configured to:
            receive the subset of communication variables from the classical computing apparatus, and
            analyze the subset communication variables to determine an actual context of the communication as held by one or more of communication parties,
        wherein either the at least one processor or the quantum processor are configured to:
            determine that the actual context of the communication poses at least potential for a security threat to one or more of the communication parties, and
            in response to determining that the actual context poses the security threat, transmit an indication of the at least potential for the security threat.

2. The system of claim 1, wherein the quantum processor is further configured to analyze the subset of communication variables to determine an actual context of the communication by comparing one or more of the communication variables in the subset to predetermined context patterns to determine at least one match between one or more of the communication variables and one or more of the predetermined context patterns.

3. The system of claim 2, wherein the quantum processor is further configured to resolve conflict between two or more matches of the one or more communication variables and the predetermined context patterns, wherein resolving the conflict provides for determining the actual context of the communication.

4. The system of claim 1, wherein the quantum processor is further configured to determine a confidence level to assign to the determined actual context, wherein the confidence level defines an accuracy of the actual context.

5. The system of claim 4, wherein either the at least one processor or the quantum processor is further configured to determine that the actual context of the communication poses a security threat based at least on the confidence level assigned to the actual context.

6. The system of claim 1, wherein (i) capturing the communication variables by the one or more sensors, (ii) transmitting the subset of communication variables to the quantum optimizer, (iii) analyzing the subset of communication variables to determine an actual context of the communication, (iv) determining that the actual context of the communication poses the security threat to one or more of the parties to the communication, and (v) transmitting the indication of the security threat to the classical computing apparatus, occur in real-time or near real-time, such that the indication of the security threat is transmitted to a classical computing device associated with the one or more parties to the communication while the communication is occurring.

7. The system of claim 1, wherein the communication comprises one of (i) a telephone conversion between two or more parties, (ii) an interaction between one or more parties and a computing device, (iii) a face-to-face communication amongst two or more parties, and (iv) an electronic communication transmitted from one party to one or more parties.

8. The system of claim 1, wherein the one or more sensors comprise at least one of (i) a microphone configured to capture audio of at least one of the communication or the environment in which the communication occurs, (ii) an image capturing device configured to capture at least one of still images of an environment in which a communication occurs or a video stream of the an environment in which a communication occurs, (iii) an optical character recognition sensor configured to capture text in an electronic communication file and (iv) one or device sensors configured to capture a state of a corresponding device associated with the device sensor.

9. The system of claim 1, wherein the classical computing apparatus further comprises a mobile communication device including a communication context determining application stored in the memory, executable by the processor and configured to:
receive a user input that activates the one or more sensors to capture the communication variables associated with the environment in which the user is a party to the communication; and
in response to (i) capturing the communication variables, (ii) transmitting the communication variables to the quantum optimizer, (iii) the quantum optimizer determining an actual context of the communication and (iv) the actual context poses at least the potential for the security threat, receive the indication of the at least the potential of the security threat.

10. The system of claim 9, wherein the communication context determining application is further configured to receive the indication while the communication is occurring.

11. A computer program product for determining an actual context of a communication, comprising a non-transitory computer-readable storage medium having computer-executable instructions for:
capturing communication variables associated with an environment in which a communication is occurring;
determining whether the communication variables are capable of being analyzed by the quantum computing device to determine an actual context;
in response to determining that the communication variables are capable of being analyzed by the quantum computing device, determining a subset of communication variables; and
transmitting the subset of communication variables to a quantum optimizer;
in response to transferring the communication variables to the quantum optimizer, receiving an indication that an actual context of the communication held by one or more parties to the communication poses at least a potential for a security threat,
wherein the quantum optimizer is configured for:
receiving the subset of communication variables,
analyzing the subset of communication variables to determine an actual context of the communication as held by one or more of communication parties,
wherein either the computer-readable storage medium further includes computer-executable instructions or the quantum optimizer is configured for:
determining that the actual context of the communication poses at least potential for a security threat to one or more of the parties to the communication, and
in response to determining that the actual context poses the security threat, transmitting the indication that the actual context of the communication held by the one or more parties to the communication poses at least the potential for the security threat.

12. A method for determining an actual context of a communication, the method comprising:
capturing, by a classical computing device processor, communication variables associated with an environment in which a communication is occurring;
determining, by the classical computing device processor, whether the communication variables are capable of being analyzed by the quantum computing device to determine an actual context;
in response to determining that the communication variables are capable of being analyzed by the quantum computing device, determining, by the classical computing device processor, a subset of communication variables;
transmitting, by the classical computing device processor, the subset of communication variables to a quantum optimizer; loathed
receiving, by the quantum optimized device processor, the subset of communication variables;
analyzing, by the quantum optimizer device, the subset of communication variables to determine an actual context of the communication as held by one or more of communication parties;
determining, by the classical computing device processor or the quantum optimizer device, that the actual context of the communication poses at least potential for a security threat to one or more of the parties to the communication; and
in response to determining that the actual context poses the security threat, transmitting, by the classical computing device processor or the quantum optimizer, an indication of the at least potential for the security threat.

13. The method of claim 12, wherein analyzing further comprises comparing, by the quantum optimizer device, one or more of the communication variables of the subset to predetermined context patterns to determine at least one match between one or more of the communication variables of the subset and one or more of the predetermined context patterns.

14. The method of claim 13, further comprising resolving, by the quantum optimizer device, conflict between two or more matches of the one or more communication variables and the predetermined context patterns, wherein resolving the conflict provides for determining the actual context of the communication.

15. The method of claim 12, further comprising determining, by the quantum optimizer device, a confidence level to assign to the determined actual context, wherein the confidence level defines an accuracy of the actual context.

16. The method of claim 15, wherein the classical computing device processor or the quantum device is further configured to determine that the actual context of the communication poses a security threat based at least on the confidence level assigned to the actual context.

17. The method of claim 12, wherein (i) capturing the communication variables by the one or more sensors, (ii) transmitting the subset of communication variables to the quantum optimizer, (iii) analyzing the subset of communication variables to determine an actual context of the communication, (iv) determining that the actual context of the communication poses the security threat to one or more of the parties to the communication, and (v) transmitting the indication of the security threat to the classical computing apparatus, occur in real-time or near real-time, such that the indication of the security threat is transmitted to a classical computing device associated with the one or more parties to the communication while the communication is occurring.

* * * * *